United States Patent [19]
Di Natale et al.

[11] Patent Number: 5,376,327
[45] Date of Patent: Dec. 27, 1994

[54] METHOD AND APPARATUS FOR HERMETIC PNEUMATIC RAPID PREFORMING OF CHOPPED FIBERS

[75] Inventors: Claude A. Di Natale, Grosse Pointe Farms; John A. McGeehan, Southfield, both of Mich.

[73] Assignee: Automotive Polymer-Based Composites Joint Venture and Development Partnership, Troy, Mich.

[21] Appl. No.: 85,589

[22] Filed: Jul. 1, 1993

[51] Int. Cl.⁵ .......................................... B29C 43/02
[52] U.S. Cl. ................................. 264/517; 264/121; 264/122; 264/128; 425/80.1
[58] Field of Search ............... 264/517, 121, 122, 128; 425/80.1

[56] References Cited

U.S. PATENT DOCUMENTS

| | | | |
|---|---|---|---|
| 1,813,861 | 7/1931 | Lee | 425/80.1 |
| 2,702,261 | 2/1955 | Bacon et al. | 264/115 |
| 2,725,601 | 12/1955 | Brenner | 425/80.1 |
| 2,929,436 | 3/1960 | Hampshire | |
| 3,177,275 | 4/1965 | Brenner | 264/121 |
| 3,494,991 | 2/1970 | Mazzio et al. | 425/80.1 |
| 5,039,465 | 8/1991 | Freeman et al. | 264/86 |
| 5,217,672 | 6/1993 | Kelman et al. | 264/517 |
| 5,229,052 | 7/1993 | Billiu | 425/80.1 |

FOREIGN PATENT DOCUMENTS 47-48510 12/1972 Japan .................... 264/517

*Primary Examiner*—Allan R. Kuhns

[57] ABSTRACT

A method and apparatus of forming a preform (12) of structural fibers (14) includes a hermetically sealed housing (18) for controlling air pressures and flow therein. A perforated screen (28) is located within the housing (18) separating same into a high pressure chamber (34) and a low pressure chamber (36). Pressurized air is supplied to the high pressure chamber (34) to agitate and randomize fibers (14), and a vacuum (26) is provided in the low pressure chamber (36) to draw and compact the fibers against the screen (28). The pressure differential between the chambers (34, 36) provides significant compaction of the fibers against the screen. A binder (16) is applied to the fibers (14) to maintain the shape of the preform.

14 Claims, 2 Drawing Sheets

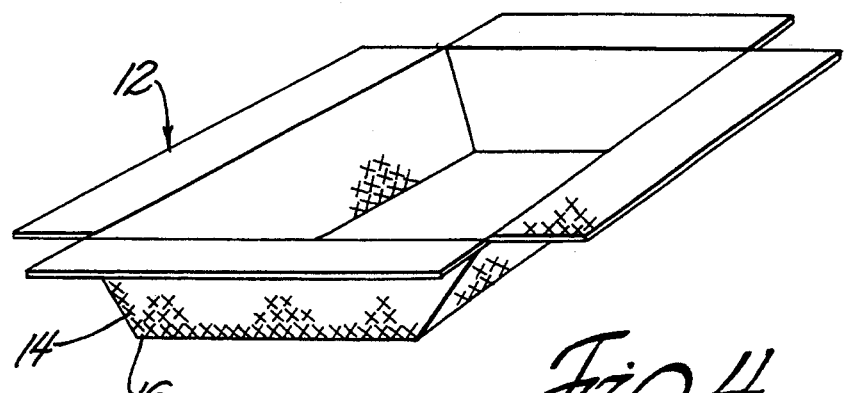
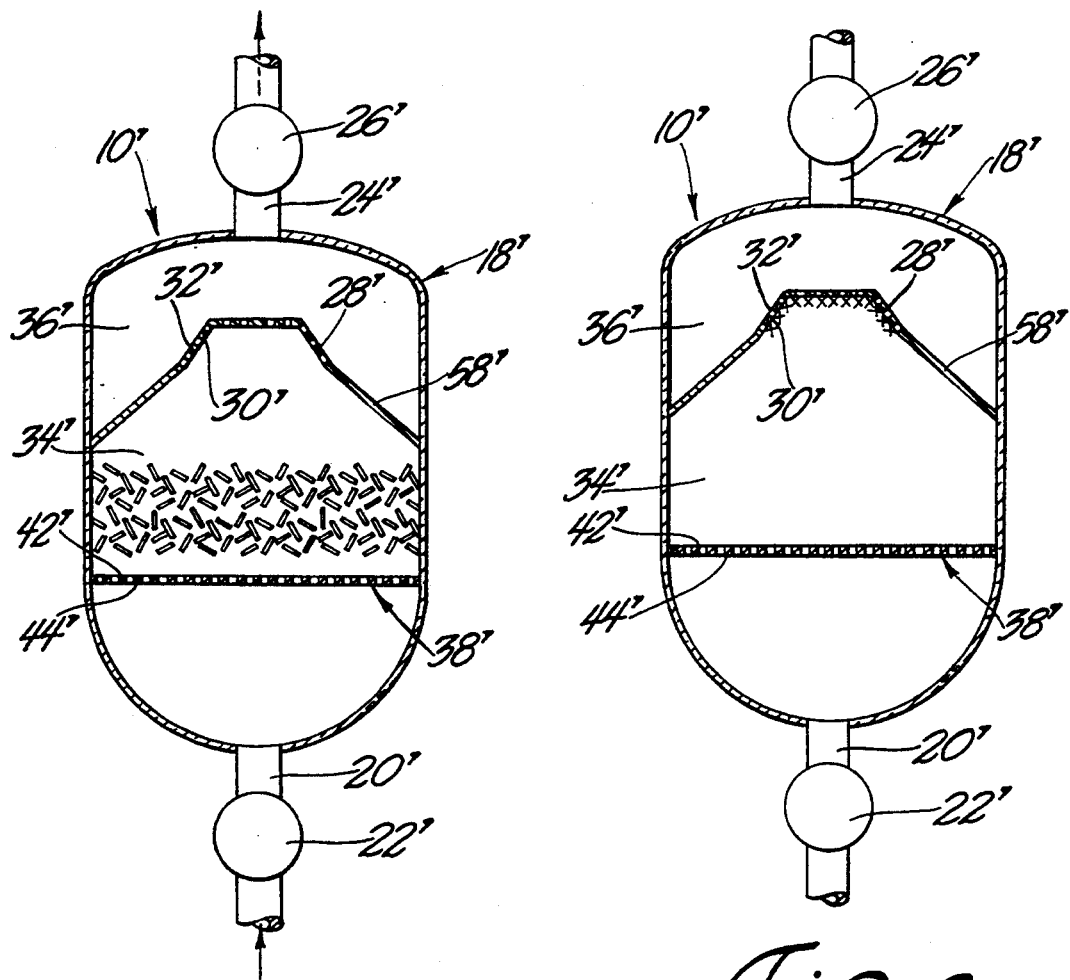

METHOD AND APPARATUS FOR HERMETIC PNEUMATIC RAPID PREFORMING OF CHOPPED FIBERS

TECHNICAL FIELD

The invention relates to a method and apparatus of fabricating a structural preform, and more particularly, toward forming a preform utilizing reinforcing fibers and resin by pneumatic control.

BACKGROUND OF THE INVENTION

Structural preforms are necessary for liquid composite molding (LCM) process. Structural preforms must be formed in the three dimensional shape complimentary of the final desired part. The preform can then be placed in a mold cavity where resin is injected to provide the final form of the part.

The preform is formed by a combination of structural fibers, such as glass fiber reinforcement, and a resin or binder material. A preform must be dense and have little loft to facilitate a high weight percent of glass in the final part. The thickness of the preform must be controlled because the closing action of the mold can tear apart the preform on surfaces with orientations close to vertical. Factors in the cost of a preform include the source of the fibers, i.e., woven mats, continuous strand mats, or chopped roving. Cycle time as well as the amount of scrap generated during each cycle are also factors in cost.

Current process of forming preforms include thermoforming, directed fiber, and slurry methods.

The thermoforming process involves cutting a blank from a glass mat. Blanks are stacked to get the proper amount and orientation of glass, and the stack is passed through an oven and placed in a die cavity. The die is closed to form the glass to the desired three-dimensional shape, and excess material is trimmed. The die is cooled to set the thermoplastic binder in the preform shape. In general, mats are costly and trimming produces significant scrap material. Furthermore, the binder pre-exists within the glass mat and therefore allows no variation in amount or distribution of the binder.

The directed fiber method utilizes a glass chopper aimed at a screen which is shaped as the desired part. A blower draws air through the screen which holds the chopped glass in place. The binder is directed onto the screen along with the glass. The screen is moved into an oven to melt the binder. Exemplary of such process is U.S. Pat. No. 2,929,436 in the name of Hampshire, issued Mar. 22, 1960 which discloses a conventional manual spraying of chopped fibers onto a preforming screen. The problem with the process is that compaction force is limited to atmospheric pressure and has a lessening effect on the outer layers of the preform producing significant loft. Furthermore, uniformity is strictly dependent upon the spray pattern.

The slurry process utilizes a screen which is originally positioned at the bottom of a tank of water. Chopped glass and binder fibers are added to the tank and the mixture is agitated by compressed air. The screen is raised through the tank, filtering all water therethrough and the glass and binder are trapped on the screen. The preform is removed from the screen and placed in an oven to dry the preform. This process is illustrated by U.S. Pat. No. 5,039,465, issued Aug. 13, 1991 in the name of Freeman et al. The problem with this type of system is that additional energy is needed to drive the screen through the water and in an added operation dry the preform. The time of drying can take up to two hours. Furthermore, the ability to produce consistent preforms time after time is unproven, as well as the ability to control the distribution of the glass fiber within a preform.

Other methods have been utilized to form preforms utilizing vacuums. Such is indicated by U.S. Pat. No. 2,725,601, issued Dec. 6, 1955 and U.S. Pat. No. 3,177,275, issued Apr. 6, 1965, both patents in the name of Brenner. In general, chopped fiber is introduced to a chamber and distributed by a fan or rotating blades at the chamber entrance. Binder may be sprayed therein. A partial vacuum is drawn behind the preforming screen to direct the fiber against the screen. The problem with this method is that there is minimal consolidation or compaction of the fibers of the preform, thereby producing significant undesirable loft.

Therefore, it is desirable to use a process which is low in cost, produces high compaction and consistency without the penalties discussed above.

SUMMARY OF THE INVENTION

The invention includes a pneumatic method of forming a contoured preform with chopped fibers. The method includes the steps of: placing chopped fibers in a hermetically sealed chamber, agitating and randomizing the chopped fibers by the introduction of pressurized air to the chamber, drawing the agitated fibers against a first side of a shaped perforated screen by application of a partial vacuum on a second side of the screen to compact the chopped fibers against the screen due to the pressure differential between the first and second sides of the screen, and binding the chopped fibers to one another producing a structural preform.

The invention also includes an apparatus for forming a contoured preform with chopped fibers. The apparatus includes a hermetically sealed housing. The housing include an inlet air opening for receiving the input of pressurized air. A shaped, perforated screen is provided which is operatively connected within the housing for allowing air to pass therethrough having a first side adjacent the chopped fibers and input of pressurized air, and a second side. Vacuum means is connected to the sealed housing adjacent the second side of the perforated screen for drawing and compacting the chopped fibers against the first side. Binding means is provided for binding compacted fibers to one another to form a structural preform.

By utilizing pneumatics instead of fluid as in the slurry process, the preform does not require drying. Furthermore, by hermetically sealing the process in a housing, the efficiency due to the pressure differential between surfaces of the screen is dramatically improved, thereby allowing significant compaction of the fibers of the preform.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a perspective view of the preform formed by the apparatus;

FIG. 5 is a schematic diagram of a second embodiment of the subject invention; and FIG. 6 is a schematic diagram of the apparatus in FIG. 5 with the vacuum applied.

DESCRIPTION OF THE PREFERRED EMBODIMENT

Figure 1:
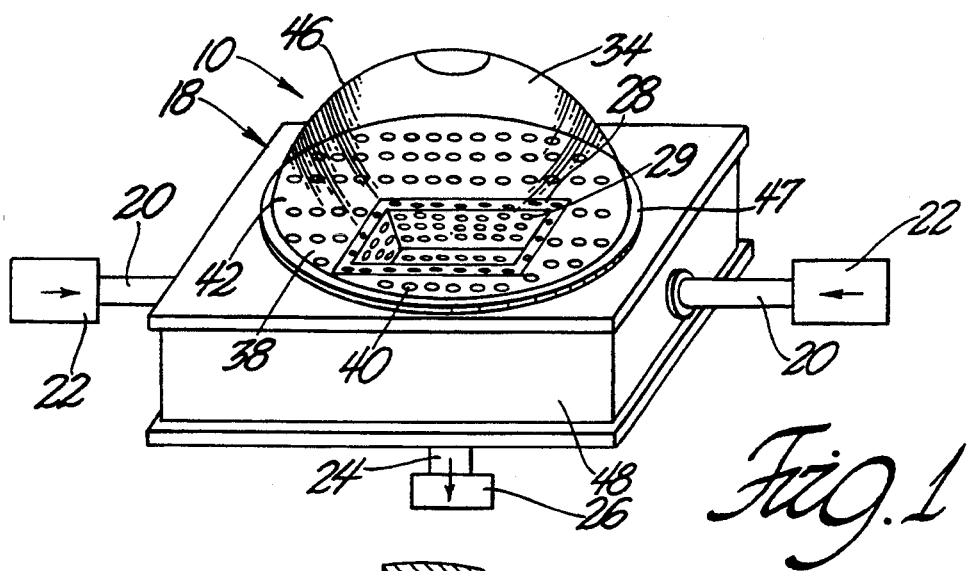
FIG. 1 is a perspective view of a first embodiment of the subject invention.

An apparatus for forming a contoured preform 12 is generally illustrated at 10 in FIG. 1. The preform 12 (FIG. 4) is formed with a fibrous material 14, such as chopped reinforcement fibers, and a resin or binder 16 for binding the fibers together. The preform 12 generally is of a three dimensional shape which, when formed, can be utilized in a liquid composite molding process to form a final structural part, such as for use in an automobile, as commonly known in the art.

The apparatus 10 includes a sealed housing 18. The housing 18 includes an inlet air opening 20 for receiving the input of pressurized air. The inlet air opening 20 is operatively connected to blower means 22 for producing the circulation of pressurized air within the sealed housing 18. Also included in the housing 18 is an outlet air opening 24. Vacuum means 26 is operatively connected to the outlet air opening 24 for drawing air out of the sealed housing 18. The housing 18 is sealed between the inlet air opening 20 and outlet air opening 24 to allow air provided by the blower 22 to escape only through the outlet air opening 24.

A shaped, perforated screen 28 is operatively connected between the inlet air opening 20 and the outlet air opening 24 for allowing air to pass through the perforations 29 therein. The screen 28 divides the sealed housing 18 into a pressurized chamber 34 and the lower pressure chamber 36. The screen 28 has a first side 30 adjacent the pressurized chamber 34 and a second side 32 adjacent the low pressure chamber 36. The pressurized chamber 34 is caused by the influx of pressurized air through the inlet air opening 20 by the blower means 22. The low pressure chamber 36 is caused by the suction or drawing of air through the outlet air opening 24 by the vacuum means 26.

Figure 2:
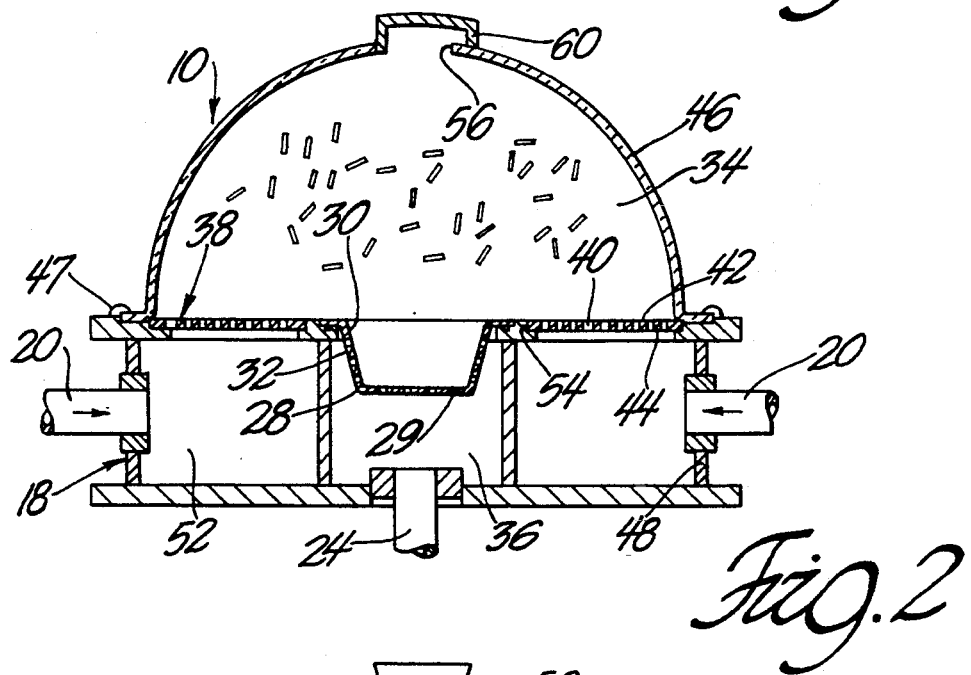
FIG. 2 is a schematic diagram of the apparatus of FIG. 1 with the fibers agitated.
Figure 3:
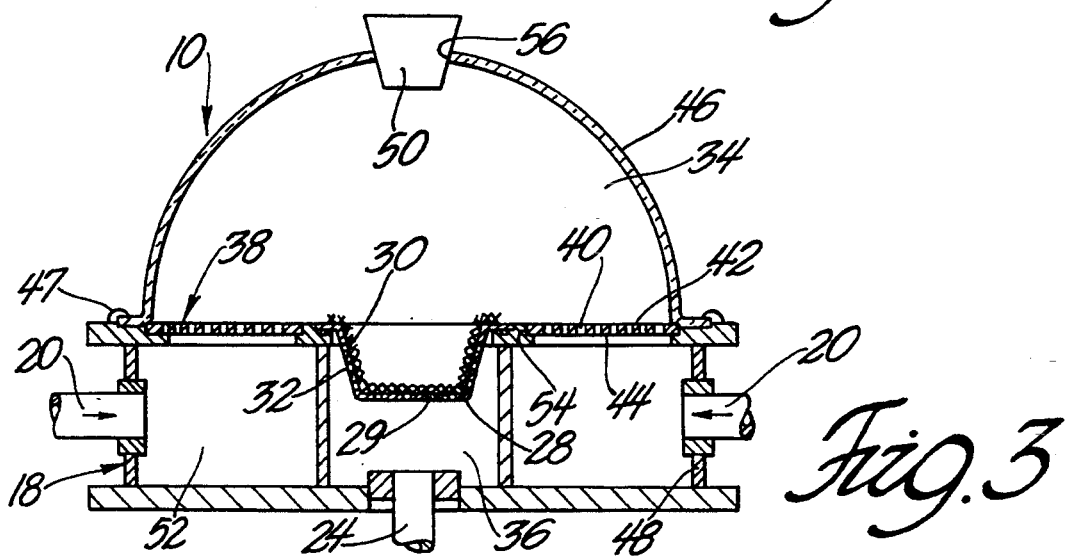
FIG. 3 is a schematic diagram of the apparatus of FIG. 1 with the vacuum applied.

The chopped reinforcement fibers 14 are introduced into the pressurized chamber 34. The inlet of pressurized air causes agitation and randomizing of the chopped fibers through the chamber 34 (FIG. 2). The subsequent and contemporaneous application of the vacuum means 26 causes the fibers 14 to be drawn against the screen 28 (FIG. 3). The creation of the differential air pressure between the pressurized chamber 34 and the low pressure chamber 36 in the sealed housing 18 is caused by the use of pressurized air and the vacuum 26 which causes significant pressures to be applied against the chopped fibers 14 and significant compaction thereof against the screen 28.

The binder material 16 is applied to the chopped reinforcement fibers 14 in order to bind the fibers 14 to one another providing the structural finished preform. The binder material 16 may be comprised of a liquid binder sprayed on the compacted chopped fibers 14 through access opening 56 during or after application of the vacuum means 26, or alternatively may include chopped thermoplastic fibers intermixed with the chopped reinforcement fibers 14 wherein subsequent application of heat to the screen 28 will melt and cure the binder fibers 16 to bind the chopped reinforcement fibers 14 to one anther.

The chopped fibers 14 may be either supplied into the sealed housing 18 from a separate external chamber during the step of adding pressurized air thereto, or alternatively may be originated within the sealed housing 18.

In the latter case, the housing 18 includes a support plate 38 operatively connected within the housing 18 about the screen 28 and dividing the chambers 34, 36. The plate 38 includes perforations 40 therein for allowing the pressurized air to pass therethrough to agitate the chopped fibers 14. In this embodiment, the chopped fibers 14 will initially be placed on the support plate 38 on a first side 42 thereof. The application of pressurized air will be applied to a second side 44 of the support plate 38 and through the perforations 40 to force the chopped fibers 14 away from the support plate 38. The air currents are such to randomize the fibers 14, 16 throughout the pressurized chamber 34. The vacuum means 36 will thereafter draw the chopped fibers 14 against the screen 28.

Alternatively, a fiber chamber 60 can be connected to the housing 18 for receiving and containing the chopped fibers 14. When the air currents are initialized, the chamber 60 is opened allowing the fibers 14 to enter the housing 18.

Supporting the concepts of the invention is included to specific embodiments utilizing the teachings of the subject invention. FIGS. 1-3 illustrate a first embodiment 10 and FIGS. 5-6 indicate an alternative embodiment 10'. Primed reference numerals are used in the second embodiment to indicate similar reference numerals as in the first embodiment.

In the first embodiment of the apparatus 10 as illustrated in FIGS. 1-3, the housing 18 includes a dome shaped lid 46 which is securable and sealable to a compartmentalized cavity 48 by sealing means 47. The cavity 48 includes a vacuum chamber comprising the low pressure chamber 36 and an inlet pressurized air chamber 52 forming a part of the pressurized chamber 34. The dome shaped lid 46 and the cavity 48 are separated by one another by the support plate 38 and screen 28. In this embodiment, the support plate 38 extends the diameter of the dome shaped lid 46 and includes an opening 54 therein for receiving the screen 28. The opening 54 is configured the size and shape of the screen 28 to support 18 the screen within the opening 54. In the preferred embodiment, the screen 28 is positioned in the opening 54 of the support plate 38 in the female orientation. However, it is to be understood that either the female or male orientation may be utilized with the screen 28. The low pressure chamber 36 is positioned below and in alignment with the opening 54 such that the low pressure chamber 36 is only in communication with the screen 28. The support plate 38 is therefore in communication with the inlet pressurized air chamber 52. The low pressure chamber 36 includes the outlet air opening 24 which is connected to the vacuum means 26. The inlet pressurized air chamber 52 includes at least one inlet air opening 20 therein. However, it is to be understood that air may be supplied to and removed from the cavity 48 with any number of openings, i.e., two openings. The inlet pressurized air chamber 52 is concentric about the low pressure chamber 36.

The air may be circulated from the vacuum means 26 to the blower means 22 providing a completely hermetically sealed apparatus 10. In other words, the vacuum lines are connected to the inlet air lines. The dome shaped lid 46 may include an access opening 56 therein for connection to the fiber chamber 60 and the supply of heat.

In the preferred embodiment, the lid 46 is lifted from the cavity 48 and the combination of chopped reinforcement fibers 14 and chopped binding fibers 16 are placed on the support plate 38. Thereafter, the dome shaped lid 46 is closed and sealed to the cavity 48. The blower means 22 is initiated to direct the pressurized air through the inlet pressurized air chamber 52 to the pressurized chamber 34 and through the support plate 38 thereby agitating and randomizing the fibers 14, 16 creating air currents through the doom shaped lid 46. Two air sources of input air currents are utilized. Thereafter, the vacuum means 26 is contemporaneously initiated and air is drawn through the vacuum chamber and through the screen 28 thereby drawing the fibers 14, 16 against the screen 28. The access opening 56 is then opened and heated air supplied therethrough to the preform 12 by heating means 50, such as a heat gun. The preform 12 is then cured. Alternatively, conduction or resistance heating may be accomplished by electrical connection to the screen 28.

Optionally, unidirectional fiber or roving can be selectively placed on the fibers 14, 16 once vacuum formed to the screen 28. Such roving can be placed manually or using a robot by access through the access opening 56.

The access opening 56 may initially be utilized for connection to the sealed fiber chamber 60 so that the fibers 14, 16 are dropped into the pressurized chamber 34 during application of the pressurized air. Once the vacuum step is completed, the chamber 60 may be removed and the heating means 50 connected to the access opening 56. FIG. 2 illustrates agitation of the fibers 14, 16. FIG. 3 illustrates the subsequent application of the vacuum, and thereafter heat.

The second embodiment 10' utilizes a vertical process which includes the housing 18' comprising an elongated cavity therein having the inlet air opening 20' located on the lower portion thereof and the outlet air opening 24' located at the upper end thereof. The support plate 38' is connected completely across the width of the cavity near the inlet air opening 20' and the fibers 14', 16' disposed thereon. The screen 28' is connected at the upper end near the outlet air opening 24. Air flow baffles 58' may be utilized to direct the air and fibers to the perforated screen 28', especially when the screen 28' is of a dimension less than the cavity size. In this process, the blower means 22' is operated at a low rate to agitate the fibers 14', 16', and thereafter at a higher rate upon application of the vacuum 26' to further compact the fibers 14', 16' with the vacuum compacting same against the screen 28'. It is also to be understood that other designs may be utilized, such as the inverted position of this embodiment. FIG. 5 illustrates the initial agitation of the fibers 14', 16' at a low pressure. FIG. 6 illustrates high inlet pressure and application of vacuum 26' and therefore compaction of the fibers 14, 16 against the screen 28'.

The method of forming the contoured preform with prechopped reinforcement fibers 14 includes the following steps. Chopped reinforcement fibers 14 are placed in a hermetically sealed chamber of the housing 18. The chopped fibers 14 are agitated and randomized by the introduction of the pressurized air into the housing 18 and pressurized chamber 34. The agitated fibers 14 are drawn against the first side 30 of the shaped-perforated screen 28 by application of the vacuum means 26 on the second side 32 of the screen 28 in the low pressure chamber 36 due to the pressure differential between the chambers 34, 36 and the first and second sides of the screen. Thereafter, the chopped fibers 14 are bonded to one another producing the structural preform 12.

The method also includes supplying chopped fibers comprising resin fibers 16 and structural reinforcement fibers 14 into the pressurized chamber 34 prior to agitation thereof. The chopped fibers 14, 16 are placed on the first side 42 of the perforated support plate 38 and thereafter agitated by the pressurized air being applied to second side 44 thereof. Heat is applied to the compacted fibers 14, 16 to activate the resin fibers 16 and bind the structural reinforcing fibers 14 to one another. The preform 12 is subsequently cooled and cured.

The material of the chopped fibers may be any type of reinforcing fibers, such as glass fibers, carbon fibers, polyester fibers, ceramic fibers, etc., and any other fibers known in the art or utilized in a structural application. The size requirement of the fibers is that the fibers 14 must be small enough to be agitated by the pressurized air and drawn by the vacuum 26, and must be large enough so as to not pull through the perforation of the screen 28. The binder fibers 16 may comprise a polyester or nylon binder fiber as commonly known in the art which may be of similar size to the structural fibers. Typical tested fibers were on the order of one half inch.

The hole perforation size in the screen 28 and support plate 38 may be varied for size, density and location to optimize fiber deposition onto the screen 28. Typical perforation sizes have included 3/32 inch diameter holes spaced anywhere from 0.186 to 0.537 inches apart. If it is desirable to densify the fiber in a particular location on the screen 28, the density of the holes can be adjusted accordingly. In other words, hole perforations closer together and/or larger in diameter can be placed at the location where densification of the fibers is desired to occur.

The apparatus 10 is environmentally sealed from the atmosphere to allow the fluids contained thereinto concentrate their interaction to maximize the efficiency of the dynamic flow inside the apparatus 10. This focuses the fiber force levels onto the screen 28 to achieve compaction of the preform fibers which is unobtainable with other preformed fabrication processes, except the slurry method. It is significant that the housing 18 be sealed in order to obtain pressures above atmospheric in the pressurized chamber 34 and therefore pressures below atmospheric in the low pressure chamber 36 in order to obtain the high pressure differential required for significant compaction of the fibers 14. In testing, it has been measured that approximately 1 psi can be obtained in the pressurized chamber 34 producing 25 pounds of compaction force on the preform without the vacuum 26.

It is determined by tests that when 40% of the holes are open in the screen 28, an initial air velocity of approximately 80 m/s will cause a pressure on the fibers 14, 16 of approximately 7.0 kPa and the pressure below the screen at 112 kPa.

It is desirable to use less than 10% of resin binder in the preformed product. Therefore, upon higher compaction, the percentage of resin may be decreased.

The vacuum means 26 and blower means 22 may be of any suitable, commonly available components. The sealing means 47 may be any type of seal and clamping combination.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method of forming a contoured preform (12) with chopped fibers (14), the method including the steps of:
    placing chopped reinforcement fibers (14) in a sealed chamber extending between an air inlet and a shaped perforated screen;
    pressurizing the sealed chamber (34) by introducing pressurized air to the chamber through the air inlet while preventing air from escaping the chamber except through the perforated screen,
    agitating the chopped fibers by the pressurized air in the chamber,
    drawing the agitated fibers (14) against a first side of the shaped perforated screen (28) by application of a vacuum (26) on a second side of the screen (28) to compact the chopped fibers (14) against the screen (28) due to the pressure differential between the first and second sides of the screen, and
    binding the chopped fibers (14) to one another producing a structural preform (12).

2. A method as set forth in claim 1 further including supplying resin fibers intermixed with the structural reinforcing fibers for compaction therewith.

3. A method as set forth in claim 2 further including applying heat to the compacted fibers (14, 16) to activate the resin fibers (16) and bind the structural reinforcing fibers (14) to one another.

4. A method as set forth in claim 3 further including placing the chopped fibers (14, 16) on a first side of a perforated support plate (38) for agitation thereof by the pressurized air applied to a second side of the perforated support plate (38).

5. A method as set forth in claim 3 further including adding the chopped fibers (14, 16) after introducing the pressurized air to the chamber.

6. A method as set forth in claim 1 further including spraying a binder for the binding step.

7. An apparatus for forming a contoured preform with chopped fibers (14), said apparatus comprising:
    a shaped, perforated screen (28) for allowing air to pass therethrough having a first side (30) adjacent the chopped fibers (14) and a second side (32);
    a housing (18) supporting said screen (28) and containing said chopped fibers (14) and including an inlet air opening (20) on said first side of said screen (28) to receive an input of pressurized air in an outlet opening (24) on said second side of said screen (28) to allow escape of air, said housing (18) being enclosed and sealed between said inlet air opening (20) and said outlet opening (24);
    vacuum means (26) connected adjacent to said second side (32) of said perforated screen (28) for drawing and compacting the chopped fibers (14) against said first side (30) by creating a pressure differential between said first and second sides of said screen; and
    setting means for binding said compacted fibers (14) to one another to form a structural preform (12).

8. An apparatus as set forth in claim 7 wherein said housing (18) includes support plate (38) operatively connected within said housing (18) for supporting said fibers (14) in a reset state without application of pressurized air on a first side and including perforations (40) therein for allowing the pressurized air to pass from a second side therethrough to agitate the fibers (14).

9. An apparatus as set forth in claim 8 further including blower means (22) connected to said inlet air opening (20) for producing the pressurized air and air currents through said perforations (40).

10. An apparatus as set forth in claim 9 wherein said housing (18) includes a dome-shaped lid (46) forming a pressurized chamber (34) connected about said support plate (38) and adjacent to said first side (30) of said screen (28) for redirecting said air currents to randomize said fibers (14), on said screen (28) connected concentricly within said support plate (38).

11. An apparatus as set forth in claim 9 wherein said housing (18) includes a vertical housing with said support plate (38) adjacent said inlet air opening (20) and vertically separated from said screen (28) with said fibers therebetween, said screen (28) connected adjacent said vacuum means (26).

12. A method of forming a preform (12) with fibers (14), the method including the steps of:
    placing fibers (14) in a sealed chamber (34) extending between an air inlet and a first side of a perforated screen (28),
    pressurizing the sealed chamber (34) by introducing pressurized air to the chamber (34) through the inlet,
    agitating the fibers in the chamber (34) by the pressurized air,
    drawing the agitated fibers (14) against the first side of the perforated screen (28) by providing a lower pressure on a second side of the screen to create a pressure differential between the first and second sides of the screen to compact the fibers (14) against the screen (28), and
    binding the fibers (14) to one another producing a structural preform (12).

13. A method as set forth in claim 12 further including the drawing comprising application of a vacuum.

14. An apparatus for forming a contoured preform with chopped fibers (14), said apparatus comprising:
    a perforated screen (28) to pass air therethrough having a first side (30) against the fibers (14) and a second side (32);
    a housing (18) including an inlet air opening (20) on said first side of said perforated screen (28);
    said housing (18) including an enclosed and sealed chamber (34) extending between said inlet air opening (20) and said first side of said perforated screen (28) containing said chopped fibers (14);
    a blower connected to said inlet air opening (20) directing pressurized air into said chamber (34);
    a vacuum source (26) connected adjacent to said second side (32) of said perforated screen (28) drawing and compacting the chopped fibers (14) against said first side (30) by creating a pressure differential between said first and second sides of said screen; and
    a heater for causing binding of said compacted fibers (14) to one another to form a structural preform (12).

* * * * *